(12) United States Patent
Marc

(10) Patent No.: US 8,298,470 B2
(45) Date of Patent: Oct. 30, 2012

(54) METHOD OF MAKING A MOLDED ARTICLE FROM TWO OR MORE DIFFERENT FORMABLE MATERIALS IN A SINGLE HEATING CYCLE

(75) Inventor: Michel Marc, Lenexa, KS (US)

(73) Assignee: Vertex L.L.C., Lenexa, KS (US)

( * ) Notice: Subject to any disclaimer, the term of this patent is extended or adjusted under 35 U.S.C. 154(b) by 173 days.

(21) Appl. No.: 10/890,904

(22) Filed: Jul. 14, 2004

(65) Prior Publication Data

US 2006/0012083 A1 Jan. 19, 2006

(51) Int. Cl.
*B29C 35/12* (2006.01)
*B29B 13/08* (2006.01)

(52) U.S. Cl. ........ 264/450; 264/451; 264/491; 264/45.1

(58) Field of Classification Search .................. 264/449, 264/450, 451, 489, 490, 491, 45.1; 425/174.8 R, 425/174.8 E
See application file for complete search history.

(56) References Cited

U.S. PATENT DOCUMENTS

| | | | |
|---|---|---|---|
| 4,268,238 A | 5/1981 | Marc | |
| 4,296,053 A | 10/1981 | Doerer et al. | |
| 4,441,876 A | 4/1984 | Marc | |
| 4,459,249 A | 7/1984 | Matsuda | |
| 4,524,037 A | 6/1985 | Marc | |
| 4,525,231 A | 6/1985 | Wnuk | |
| 4,824,617 A | 4/1989 | Takeuchi et al. | |
| 4,851,167 A | 7/1989 | Marc | |
| 4,921,647 A * | 5/1990 | Stewart | 264/490 |
| 6,299,807 B1 | 10/2001 | Kimura et al. | |
| 2006/0012082 A1 | 1/2006 | Marc | |

FOREIGN PATENT DOCUMENTS

| | | |
|---|---|---|
| EP | 0 389 798 A2 | 10/1990 |
| EP | 1 053 849 A2 | 11/2000 |
| GB | 1097009 | 12/1967 |

* cited by examiner

*Primary Examiner* — Mathieu D. Vargot
(74) *Attorney, Agent, or Firm* — Stinson Morrison Hecker LLP

(57) ABSTRACT

A method of making a molded article from two or more different formable materials having different molding temperatures in a single heating or molding cycle. One of the formable materials is selected as a reference material, and the remaining formable materials are modified so that all of the formable materials reach their respective molding temperatures at substantially the same time. Preferably, each of the remaining formable materials is modified by mixing a suitable amount of an additive therewith so as to adjust the power factor of the formable material. All of the formable materials are then placed in a flow molding apparatus whereby an alternating dielectric field is applied across the formable materials to form the molded article.

23 Claims, 6 Drawing Sheets

METHOD OF MAKING A MOLDED ARTICLE FROM TWO OR MORE DIFFERENT FORMABLE MATERIALS IN A SINGLE HEATING CYCLE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention is generally directed to the field of flow molding, and is more specifically directed to a unique flow molding process for making a molded article from two or more different formable materials having different molding temperatures in a single heating or molding cycle.

2. Description of Related Art

Various flow molding apparatuses are known in the art that employ dielectric heating to mold a plastic part from a formable plastic material. In all of these apparatuses, the plastic material is placed between two electrodes such that the material effectively becomes the dielectric of a capacitor. An alternating electric field generated between the electrodes causes polar molecules in the plastic material to be attracted and repelled by the rapidly changing polarity of the electric field. The friction resulting from this molecular movement causes the plastic material to heat throughout its entire mass to thereby form the molded article.

One flow molding apparatus known in the art for making plastic parts comprises a top electrode and a bottom electrode with top and bottom molds disposed therebetween. The top and bottom molds define a molding cavity in which a plastic material may be placed. Preferably, the current field lines are perpendicular to the plastic material at all points along its surface to thereby provide a uniform temperature throughout the material. In addition, the top and bottom electrodes substantially match the configuration of the plastic part that is being fabricated such that the distance between the electrodes is constant in order to provide uniform heating of the plastic material. In operation, an alternating electric field is applied across the molding cavity to thereby form the plastic part. An example of this type of a flow molding apparatus is disclosed in U.S. Pat. No. 4,268,238.

Another flow molding apparatus known in the art for making plastic parts comprises a top electrode and a bottom electrode with a mold disposed therebetween. The mold has a non-uniform thickness so as to allow the molding of a non-uniform plastic part from a plastic material placed between the mold and the top electrode. In order to provide uniform heating throughout the plastic material, a constant capacitance is maintained throughout all of the different thickness sections of the plastic part. This may be accomplished by equalizing the relative dielectric constants between the plastic material and the mold, preferably by altering the relative dielectric constant of the mold via the use of additives. Alternatively, the capacitance may be equalized by modifying the spacing between the top and bottom electrodes in the different thickness sections of the plastic part. An example of this type of a flow molding apparatus is disclosed in U.S. Pat. No. 4,441,876.

Another flow molding apparatus known in the art for making foamed plastic parts comprises a top electrode and a bottom electrode with a mold disposed therebetween. A plastic foam material may be placed in a cavity of the mold and then compressed during the heating cycle. After the heat is terminated, the compressed plastic foam material is permitted to expand as it cools so as to conform to the shape of the mold and thereby form the foamed plastic part. An example of this type of a flow molding apparatus is disclosed in U.S. Pat. No. 4,524,037.

Yet another flow molding apparatus known in the art for making foamed plastic parts comprises a top electrode and a bottom electrode with a two-piece mold disposed therebetween. The mold supports a diaphragm such that a plastic foam material may be placed between the diaphragm and the bottom mold. A fluid is injected into the mold above the diaphragm so as to initially deflect the diaphragm and thus expel substantially all of the air from the mold. The fluid is then extracted from the mold during the heating cycle, which causes a vacuum in the mold to thereby assist in the expansion of the plastic foam material. An example of this type of an apparatus is disclosed in U.S. Pat. No. 4,851,167.

All of the flow molding apparatuses described above have heretofore been utilized for manufacturing plastic parts made of a single plastic material. In order to make plastic parts comprised of two or more layers of different plastic materials, it is necessary to fabricate each layer in a separate molding process and then bond the layers together to form the plastic part. Thus, there is a need in the art for a molding process that enables the fabrication of plastic parts from two or more layers of different plastic materials in a single heating or molding cycle.

BRIEF SUMMARY OF THE INVENTION

The present invention is directed to a method of making a molded article from two or more different formable materials having different molding temperatures in a single heating or molding cycle. In general, one of the formable materials is selected as a reference material, and the remaining formable materials are modified so that all of the formable materials reach their respective molding temperatures at substantially the same time. Preferably, each of the remaining formable materials is modified by mixing a suitable amount of an additive therewith so as to adjust the power factor of the formable material. All of the formable materials are then placed in a flow molding apparatus whereby an alternating dielectric field is applied across the formable materials to form the molded article.

In an exemplary method, a molded article is made from two different formable materials placed between a top mold and a bottom mold of a flow molding apparatus. In this example, the first formable material is selected as the reference material. As such, the power factor of the first formable material is used to calculate its molding time (i.e., the time that it takes for the first formable material to reach its molding temperature).

The molding time of the first formable material is then used to calculate a required power factor for the second formable material. The required power factor for the second formable material will be the power factor that allows the second formable material to reach its molding temperature at substantially the same time that the first formable material reaches its molding temperature. By equalizing the molding times of both formable materials, the molded article may be formed in the same heating or molding cycle.

The molding time of the first formable material is also used to calculate required power factors for the top mold and the bottom mold. In this example, the temperatures of the top and bottom molds are chosen so that the molded article will cure all the way through. As such, the required power factor for the top mold will be the power factor that allows the surface of the top mold in contact with the first formable material to reach a temperature that is substantially the same as the molding temperature of the first formable material at the end of the heating cycle. Similarly, the required power factor for the bottom mold will be the power factor that allows the surface of the bottom mold in contact with the second formable material to reach a temperature that is substantially the same as the molding temperature of the second formable material at the end of the heating cycle. Alternatively, for a formable material that comprises a foam material, the temperature of the mold in contact with such material could be lowered such that a hardened skin is formed on a surface of the molded article.

Next, the power factors of the second formable material, the top mold and the bottom mold are each adjusted to match their respective required power factors. For each of these materials, the power factor is adjusted by selecting an additive, calculating an amount of the additive to be mixed with the material so that the power factor substantially matches the required power factor, and then mixing the calculated amount of additive with the material. Finally, the first and second formable materials are placed between the top and bottom molds of the flow molding apparatus. In operation, an alternating dielectric field is applied across the first and second formable materials causing them to flow together and bond to one another to thereby form the molded article.

In general, the method of the present invention may be used to make a molded article in which the different formable materials are arranged in distinct layers (i.e., each formable material comprises a distinct layer of the molded article). Alternatively, the method may be used to make a molded article in which the different formable materials are blended together. Furthermore, the method may be used to make a molded article with distinct layers wherein one or more of the layers comprises a blend of different formable materials.

Advantageously, the method of the present invention allows a molded article to be made from different formable materials in a single heating or molding cycle so as to substantially decrease the processing times and costs associated with the manufacture of molded articles. In addition, the method may be used to make a molded article from a blend of different formable materials to thereby allow the manufacture of molded articles having novel chemical compositions with improved physical properties.

BRIEF DESCRIPTION OF THE DRAWINGS

The method of the present invention will be described in greater detail in the following detailed description of the invention with reference to the accompanying drawings that form a part hereof, in which.

DETAILED DESCRIPTION OF THE INVENTION

Figure 1:
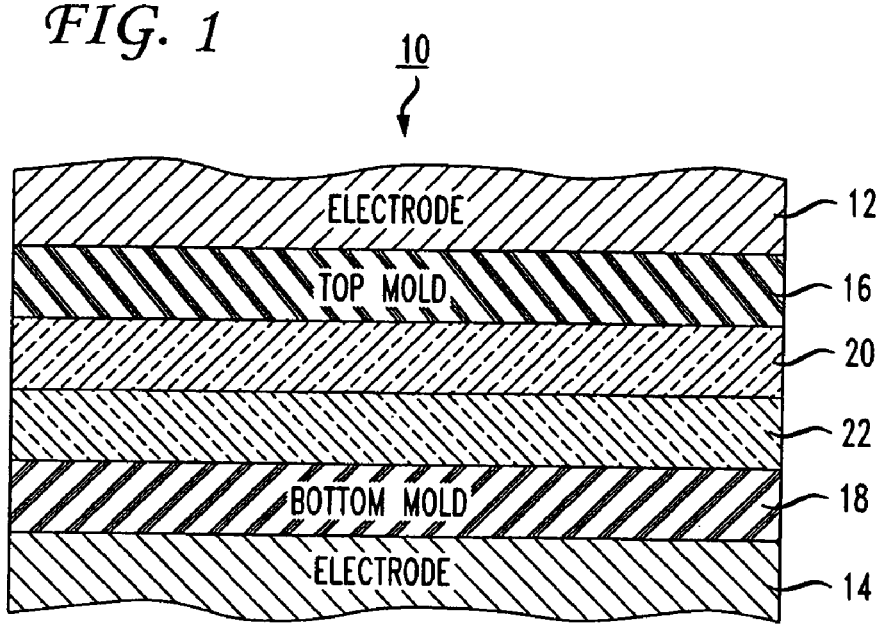
FIG. 1 is a diagram of a flow molding apparatus wherein two different formable materials (both non-foam materials) have been placed between a top mold and a bottom mold of the apparatus for making a molded article in accordance with the method of the present invention.

The present invention is directed to a method of making a molded article from two or more different formable materials having different molding temperatures in a single heating or molding cycle. In accordance with this method, one of the formable materials is selected as a reference material, and the remaining formable materials are modified so that all of the formable materials reach their respective molding temperatures at substantially the same time. The formable materials are then placed in a flow molding apparatus whereby an alternating dielectric field is applied across the formable materials to form the molded article. One skilled in the art will understand that the method of the present invention may be used to manufacture a variety of different types of molded articles for use in a variety of different industries.

As used herein, the term "formable material" means any material that is capable of being heated such that it may form a defined shape within a mold of a flow molding apparatus, including, but not limited to, thermoplastics and thermosets. Examples of thermoplastics that are suitable for use as a formable material include ABS, acetal, acrylic (plexiglass), methylacrylate, polyamide (nylon), polycarbonate, polyester, ethylene vinyl acetate (EVA), ethylene vinyl alcohol, ethylene methyl acrylate, polyvinyl chloride (PVC), plastisol, polyvinylidene fluoride, surlyn ionomeror, thermoplastic urethane, and thermoplastic olefin. Examples of thermosets that are suitable for use as a formable material include acrylic, epoxy, phenolic, polyester, melamine formaldehyde, composites, and rubbers. Of course, other thermoplastics and thermosets may also be used in accordance with the present invention. It should be understood that certain formable materials are not sufficiently polar and, thus, may be mixed with one or more polar additives to obtain the necessary polarity (which renders virtually any formable material capable of being molded with the method of the present invention).

For certain types of molded articles, it may be desirable to mix a blowing agent and/or cross-linker with a formable material to form a foam material. Examples of foam materials that are suitable for use as a formable material include cross-linked PE-EVA foam, PVC foam, vinyl nitrile foam, and neoprene foam. Of course, other foam materials may also be used in accordance with the present invention.

It should be understood that each of the foregoing formable materials has a molding temperature and molding time associated therewith. As used herein, the term "molding temperature" means the temperature at which a formable material is heated such that it may form a defined shape within a mold of a flow molding apparatus. For example, the molding temperature of a thermoplastic will typically be its melting temperature, and the molding temperature of a thermoset will typically be its curing temperature. Also, the molding temperature of a foam material will typically be the temperature at which the foam material is blown and/or cross-linked. Furthermore, the term "molding time" as used herein means the amount of time required for a formable material to reach its molding temperature (which, as described hereinbelow, may be changed by adjusting the power factor of the formable material).

Referring to FIG. 1, the method of the present invention will now be described with reference to the diagram of a flow molding apparatus designated generally as numeral 10, which may be used to make molded articles from non-foam materials (it will be seen that an apparatus used to make molded articles from foam materials will be described hereinbelow with reference to FIG. 2). Flow molding apparatus 10 includes a top electrode 12 and a bottom electrode 14, both of which are connected to an electromagnetic energy source (not shown) operable to generate an alternating electric field between the electrodes. The alternating electric field may be generated-at frequencies ranging from 1 MHz to 500 MHz, is preferably generated at frequencies ranging from 10 MHz to 100 MHz, and is most preferably generated at either 26 MHz or 40 MHz. Also included within apparatus 10 are a top mold 16 and a bottom mold 18 that together define a molding cavity therebetween.

In the illustrated example, a first formable material 20 and a second formable material 22 (both of which comprise non-foam materials) are placed within the molding cavity such that first formable material 20 is in contact with the bottom surface of top mold 16 and second formable material 22 is in contact with the top surface of bottom mold 18. Of course, it should be understood that more than two formable materials could also be placed within the molding cavity. In operation, an alternating dielectric field is applied across first and second formable materials 20 and 22 causing them to flow together and bond to one another to thereby form the molded article.

Referring still to FIG. 1, it can be seen that there are four layers of material between top electrode 12 and bottom electrode 14, namely, top mold 16 (layer 1), first formable material 20 (layer 2), second formable material 22 (layer 3), and bottom mold 18 (layer 4). The following general equations may be established with respect to these four layers of material (which will be used hereinbelow to describe the method of the present invention). It should be understood that the subscript i in these equations denotes the layer number of the particular material (i.e., subscript 1 denotes top mold 16 (layer 1), subscript 2 denotes first formable material 20 (layer 2), subscript 3 denotes second formable material 22 (layer 3), and subscript 4 denotes bottom mold 18 (layer 4)).

First, the capacitance of each layer of material may be expressed by the following equation:

$$C_i = \frac{25.4 \times \varepsilon_i \times A_i}{36 \times \pi \times d_i} \quad (1)$$

where
$C_i$=capacitance of layer i in picofarads
$\varepsilon_i$=relative dielectric constant of layer i
$A_i$=area of layer i in inches$^2$
$d_i$=thickness of layer i in inches.

The equivalent capacitance of all four layers of material is given by the following equation:

$$C_{eq} = \frac{C_1 \times C_2 \times C_3 \times C_4}{(C_1 \times C_2 \times C_3) + (C_1 \times C_2 \times C_4) + (C_1 \times C_3 \times C_4) + (C_2 \times C_3 \times C_4)} \quad (2)$$

where
$C_{eq}$=equivalent capacitance of layers in picofarads
$C_1$=capacitance of layer 1 in picofarads
$C_2$=capacitance of layer 2 in picofarads
$C_3$=capacitance of layer 3 in picofarads
$C_4$=capacitance of layer 4 in picofarads.

The equivalent reactance associated with the equivalent capacitance of all four layers of material may then be given by the following equation:

$$X_{eq} = \frac{1}{2 \times \pi \times f \times C_{eq}} \quad (3)$$

where
$X_{eq}$=equivalent reactance of layers in ohms
f=frequency of dielectric field in hertz
$C_{eq}$=equivalent capacitance of layers in farads.

The resistance of each layer of material is equal to the product of the power factor of that layer and the equivalent reactance. Therefore, using the equivalent reactance from equation (3), the resistance of each layer of material may be expressed as follows:

$$R_i = \frac{pf_i}{2 \times \pi \times f \times C_i} \quad (4)$$

where
$R_i$=resistance of layer i in ohms
$pf_i$=power factor of layer i
f=frequency of dielectric field in hertz
$C_i$=capacitance of layer i in farads.

Next, the current passing between top electrode 12 and bottom electrode 14 through all four layers of material may be represented by the following equation:

$$I = \frac{V}{\sqrt{X_{eq}^2 + R_{eq}^2}} \quad (5)$$

where
I=current in amperes
V=voltage between the electrodes in volts
$X_{eq}$=equivalent reactance of layers in ohms
$R_{eq}$=equivalent resistance of layers in ohms.

Assuming that the equivalent resistance of all four layers of material is small compared to the equivalent reactance, equation (5) may be simplified as follows:

$$I = \frac{V}{X_{eq}} \quad (6)$$

Furthermore, the power that is dissipated in each layer of material due to the application of the dielectric field may be expressed by the following equation:

$$P_i = R_i \times I^2 \quad (7)$$

where
$P_i$=power of layer i in watts due to the dielectric field
$R_i$=resistance of layer i in ohms
I=current in amperes.

By combining equations (4) and (7), the power that is dissipated in each layer of material due to the application of the dielectric field may be expressed as follows:

$$P_i = \frac{pf_i \times I^2}{2 \times \pi \times f \times C_i} \quad (8)$$

Now, the increase in temperature of each layer of material during the heating cycle may be represented by the following equation:

$$\Delta T_i = \frac{P_i \times t_i}{16.387 \times h_i \times \rho_i \times d_i} \quad (9)$$

where
$\Delta T_i$=increase in temperature of layer i in degrees Celsius
$P_i$=power of layer i in watts due to the dielectric field
$t_i$=molding time of layer i in seconds
$h_i$=specific heat of layer i
$\rho_i$=specific gravity of layer i
$d_i$=thickness of layer i in inches.

By combining equations (8) and (9) and solving the resultant equation for $t_i$, the molding time for each layer of material may be expressed by the following equation:

$$t_i = \frac{16.387 \times \Delta T_i \times h_i \times \rho_i \times d_i}{\frac{pf_i \times I^2}{2 \times \pi \times f \times C_i}} \quad (10)$$

Equation (10) may then be solved for $pf_i$ such that the power factor for each layer of material may be expressed as follows:

$$pf_i = \frac{16.387 \times \Delta T_i \times h_i \times \rho_i \times d_i \times 2 \times \pi \times f \times C_i}{t_i \times I^2} \quad (11)$$

In accordance with the method of the present invention, one of the layers of material is selected as the reference material. In this example, first formable material 20 is selected as the reference material (although it should be understood that any of the four layers of material could have been selected as the reference material). Equation (10) may then be used to calculate the molding time ($t_2$) of first formable material 20 (i.e., the time that it takes for first formable material 20 to reach its molding temperature). It can be seen from equation (10) that the molding time ($t_2$) of first formable material 20 is a function of the following factors: the increase in temperature ($\Delta T_2$) required for first formable material 20 to reach its molding temperature; the specific heat ($h_2$) of first formable material 20; the specific gravity ($\rho_2$) of first formable material 20; the thickness ($d_2$) and capacitance ($C_2$) of first formable material 20; the power factor ($pf_2$) of first formable material 20; the current (I) passing between top electrode 12 and bottom electrode 14 (which may be calculated from equation (6)); and the frequency (f) of the dielectric field.

Next, the molding time ($t_2$) of first formable material 20 is used to calculate a required power factor ($pf_3$) for second formable material 22. It should be understood that the required power factor ($pf_3$) for second formable material 22 will be the power factor that allows second formable material 22 to reach its molding temperature at substantially the same time that first formable material 20 reaches its molding temperature. By equalizing the molding times of both formable materials, the molded article may be formed in the same heating or molding cycle.

Equation (11) may be used to calculate the required power factor ($pf_3$) for second formable material 22. It can be seen from equation (11) that the required power factor ($pf_3$) of second formable material 22 is a function of the following factors: the increase in temperature ($\Delta T_3$) required for second formable material 22 to reach its molding temperature; the specific heat ($h_3$) of second formable material 22; the specific gravity ($\rho_3$) of second formable material 22; the thickness ($d_3$) and capacitance ($C_3$) of second formable material 22; the frequency (f) of the dielectric field; the molding time ($t_2$) of first formable material 20; and the current (I) passing between top electrode 12 and bottom electrode 14 (which may be calculated from equation (6)).

The molding time ($t_2$) of first formable material 20 is also used to calculate a required power factor ($pf_1$) for top mold 16 and a required power factor ($pf_4$) for bottom mold 18. In this example, the temperatures of top mold 16 and bottom mold 18 are preferably chosen so that the molded article will cure all the way through. As such, the required power factor ($pf_1$) for top mold 16 will be the power factor that allows the bottom surface of top mold 16 to reach a temperature that is substantially the same as the molding temperature of first formable material 20 at the end of the heating cycle. Similarly, the required power factor ($pf_4$) for bottom mold 18 will be the power factor that allows the top surface of bottom mold 18 to reach a temperature that is substantially the same as the molding temperature of second formable material 22 at the end of the heating cycle. Preferably, the thickness of the bottom surface of top mold 16 and the top surface of bottom mold 18 reaching temperatures that are substantially the same as the molding temperatures of first formable material 20 and second formable material 22, respectively, is ⅛ inch. Of course, other thickness values could also be used in accordance with the present invention (although greater thickness values will result in the use of more RF energy and will require a longer cooling period for the molds at the end of the heating cycle).

Equation (11) may be used to calculate the required power factor ($pf_1$) for top mold 16 and the required power factor ($pf_4$) for bottom mold 18. It can be seen from equation (11) that the required power factor ($pf_1$) for top mold 16 is a function of the following factors: the increase in temperature ($\Delta T_1$) required for top mold 16 to reach the molding temperature of first formable material 20; the specific heat ($h_1$) of top mold 16; the specific gravity ($\rho_1$) of top mold 16; the thickness ($d_1$) and capacitance ($C_1$) of top mold 16; the frequency (f) of the dielectric field; the molding time ($t_2$) of first formable material 20; and the current (I) passing between top electrode 12 and bottom electrode 14 (which may be calculated from equation (6)). Similarly, the required power factor ($pf_4$) for bottom mold 18 is a function of the following factors: the increase in temperature ($\Delta T_4$) required for bottom mold 18 to reach the molding temperature of second formable material 22; the specific heat ($h_4$) of bottom mold 18; the specific gravity ($\rho_4$) of bottom mold 18; the thickness ($d_4$) and capacitance ($C_4$) of bottom mold 18; the frequency (f) of the dielectric field; the molding time ($t_2$) of first formable material 20; and the current (I) passing between top electrode 12 and bottom electrode 14 (which may be calculated from equation (6)).

Next, the power factors of second formable material 22, top mold 16 and bottom mold 18 are each adjusted to match their respective required power factors. The power factor of each of these materials may be adjusted by various means known in the art, and is preferably adjusted by selecting an additive, calculating an amount of the additive to be mixed with the material so that the power factor substantially matches the required power factor, and then mixing the calculated amount of additive with the material. It should be understood that a selected additive may be used to increase or decrease the power factor of a material and, preferably, does not otherwise alter the properties of the material. Of course, in order to obtain faster processing times, it may be desirable to use a polar additive or an anti-static additive that function to increase the power factor of a material (assuming that the material with the fastest molding time is chosen as the reference material such that the remaining materials must be modified to increase their respective power factors). One skilled in the art will also understand that it may be desirable to use a mixture of two or more additives (depending on the power factor of each of the additives as a function of temperature).

Once an additive is selected for each of the materials, the following general equations may be used to calculate the amount of the additive to be mixed with the material so that the power factor substantially matches the required power factor. First, the power factor equivalent for the material/additive mixture may be expressed by the following equation:

$$pf_{eq} = \frac{(pf_{material} \times d_{material} \times \varepsilon_{additive}) + (pf_{additive} \times d_{additive} \times \varepsilon_{material})}{(\varepsilon_{material} \times d_{additive}) + (\varepsilon_{additive} \times d_{material})} \quad (12)$$

where $pf_{eq}$=power factor equivalent of the material/additive mixture $pf_{material}$=power factor of the material to be modified $Pf_{additive}$=power factor of the selected additive $d_{material}$=thickness of the material to be modified $d_{additive}$=thickness of the selected additive $\varepsilon_{material}$=relative dielectric constant of the material to be modified $\varepsilon_{additive}$=relative dielectric constant of the selected additive.

Now, assume x is the percentage of the mixture by volume comprising the additive and (100-x) is the percentage of the mixture by volume comprising the material. Substituting x for $d_{additive}$ and (100-x) for $d_{material}$, equation (12) may be rewritten as follows:

$$pf_{eq} = \frac{(pf_{material} \times (100-x) \times \varepsilon_{additive}) + (pf_{additive} \times x \times \varepsilon_{material})}{(\varepsilon_{material} \times x) + (\varepsilon_{additive} \times (100-x))} \quad (13)$$

Equation (13) may then be solved for x and rewritten as follows:

$$x = \frac{(100 \times pf_{material} \times \varepsilon_{additive}) - (100 \times pf_{eq} \times \varepsilon_{additive})}{(pf_{eq} \times \varepsilon_{material}) - (pf_{eq} \times \varepsilon_{additive}) + (pf_{material} \times \varepsilon_{additive}) - (pf_{additive} \times \varepsilon_{material})} \quad (14)$$

Thus, equation (14) may be used to calculate the amount of the selected additive to be mixed with second formable material 22 so that the power factor equivalent ($pf_{eq}$) of the mixture substantially matches the required power factor ($pf_3$) of second formable material 22 calculated above (i.e., $pf_{eq}=pf_3$). Similarly, equation (14) may be used to calculate the amount of the selected additive to be mixed with top mold 16 so that the power factor equivalent ($pf_{eq}$) of the mixture substantially matches the required power factor ($pf_1$) of top mold 16 calculated above (i.e., $Pf_{eq}=pf_1$). Furthermore, equation (14) may be used to calculate the amount of the selected additive to be mixed with bottom mold 18 so that the power factor equivalent ($pf_{eq}$) of the mixture substantially matches the required power factor ($pf_4$) of bottom mold 18 calculated above (i.e., $pf_{eq}=pf_4$)

Finally, after the power factors of second formable material 22, top mold 16 and bottom mold 18 have each been adjusted to match their respective required power factors, first and second formable materials 20 and 22 are placed between top and bottom molds 16 and 18 of flow molding apparatus 10. In operation, an alternating dielectric field is applied across first and second formable materials 20 and 22 (as well as top and bottom molds 16 and 18) whereby the materials reach their respective molding temperatures at substantially the same time. Thus, in accordance with the method of the present invention, the molded article may be formed of two different formable materials in a single heating or molding cycle.

It should be understood that the analysis set forth above will provide a close approximation of the values for the molding time, required power factors, and amount of additive to be mixed with the various layers of material to obtain the required power factors. However, if more exact values are desired, it is necessary to take into account the heat exchange between adjacent layers of material. In other words, while the above equations include the power ($P_i$) that is dissipated in each layer of material due to the application of the dielectric field, they do not take into account the heat that is transferred from one layer of material to another during the heating cycle.

The heat generated in a layer of material i due to the adjacent layer i−1 may be expressed as follows:

$$Q_{i,i-1} = \frac{k_{i-1} \times k_i}{k_{i-1} + k_i}(T_{i-1} - T_i)\frac{2}{d_i} \quad (15)$$

where $Q_{i,\,i-1}$=power of layer i in watts due to heat exchange from layer i−1

$k_{i-1}$=thermal conductivity of layer i−1 in watts/inches$^2$/inch/° C.

$k_i$=thermal conductivity of layer i in watts/inches²/inch/° C.

$T_{i-1}$=temperature of layer i−1 in degrees Celsius $T_i$=temperature of layer i in degrees Celsius $d_i$=thickness of layer i in inches Similarly, the heat generated in a layer of material i due to the adjacent layer i+1 may be expressed as follows:

$$Q_{i,i+1} = \frac{k_{i+1} \times k_i}{k_{i+1} + k_i}(T_{i+1} - T_i)\frac{2}{d_i} \qquad (16)$$

where $Q_{i,\,i+1}$=power of layer i in watts due to heat exchange from layer i+1

$k_{i+1}$=thermal conductivity of layer i+1 in watts/inches²/inch/° C.

$k_i$=thermal conductivity of layer i in watts/inches²/inch/° C.

$T_{i+1}$=temperature of layer i+1 in degrees Celsius $T_i$=temperature of layer i in degrees Celsius $d_i$=thickness of layer i in inches Accordingly, equations (16) and (17) may be combined such that the heat generated in a layer of material i due to both of the adjacent layers i−1 and i+1 may be expressed as follows:

$$Q_i = \frac{2}{d_i}\left[\frac{k_{i-1} \times k_i}{k_{i-1} + k_i}(T_{i-1} - T_i) + \frac{k_{i+1} \times k_i}{k_{i+1} + k_i}(T_{i+1} - T_i)\right] \qquad (17)$$

Now, by combining equations (8) and (17), the total power dissipated in a layer of material i due to the application of the dielectric field and the heat exchange between adjacent layers of material may be expressed as follows:

$$P_i + Q_i = \frac{pf_i \times I^2}{2 \times \pi \times f \times C_i} + \frac{2}{d_i}\left[\frac{k_{i-1} \times k_i}{k_{i-1} + k_i}(T_{i-1} - T_i) + \frac{k_{i+1} \times k_i}{k_{i+1} + k_i}(T_{i+1} - T_i)\right] \qquad (18)$$

One skilled in the art will understand that equation (18) may then be used (in place of equation (8)) in connection with the analysis set forth above to calculate more exact values for the molding time of first formable material 20, the required power factors for second formable material 22, top mold 16 and bottom mold 18, and the amount of additive to be mixed with second formable material 22, top mold 16 and bottom mold 18 in order to obtain the required power factors.

It should also be understood that the analysis set forth above does not take into account the fact that the power factor, relative dielectric constant, specific heat and thermal conductivity of each of the layers of material vary with temperature. Therefore, in order to obtain more exact values for the molding time, required power factors, and amount of additive to be mixed with the various layers of material to obtain the required power factors, it is necessary to calculate the above equations at regular time intervals (such as 1 second time intervals) for each of the layers of material. By doing so, it is possible to use the values for the power factor, relative dielectric constant, specific heat and thermal conductivity that correspond to the temperature of each of the layers of material at that particular point in time. Preferably, a computer is programmed to perform these calculations in order to simplify the analysis.

It should further be understood that the analysis set forth above becomes much more complex as additional formable materials are placed between top mold 16 and bottom mold 18. Specifically, where there are n total layers of material, the total power dissipated in a particular layer of material i every second due to the application of the dielectric field and the heat exchange between adjacent layers of material may be expressed by the following equation:

$$P_i + Q_i = \frac{V^2 \times f \times 2.54 \times 10^{-11} \times pf_i \times d_i}{\varepsilon_i \times 18\left[\left(\frac{pf_1 \times d_1}{\varepsilon_1} + \frac{pf_2 \times d_2}{\varepsilon_2} + \ldots + \frac{pf_n \times d_n}{\varepsilon_n}\right)^2 + \left(\frac{d_1}{\varepsilon_1} + \frac{d_2}{\varepsilon_2} + \ldots + \frac{d_n}{\varepsilon_n}\right)^2\right]} + \frac{2}{d_i}\left[\frac{k_{i-1} \times k_i}{k_{i-1} + k_i}(T_{i-1} - T_i) + \frac{k_{i+1} \times k_i}{k_{i+1} + k_i}(T_{i+1} - T_i)\right] \qquad (19)$$

where $P_i$=power of layer i in watts due to the dielectric field $Q_i$=heat exchange between layer i and layers (i+1) and (i−1) in watts V=voltage between the electrodes in volts f=frequency of the dielectric field in hertz $pf_i$=power factor of layer i $d_i$=thickness of layer i in inches $\varepsilon_i$=relative dielectric constant of layer i $Pf_{1, 2, \ldots n}$=power factor of the denoted layer $d_{1, 2, \ldots n}$=thickness of the denoted layer in inches $\varepsilon_{1, 2, \ldots n}$=relative dielectric constant of the denoted layer $k_{i-1}$=thermal conductivity of layer i−1 in watts/inches²/inch/° C.

$k_{i+1}$=thermal conductivity of layer i+1 in watts/inches²/inch/° C.

$k_i$=thermal conductivity of layer i in watts/inches²/inch/° C.

$T_{i-1}$=temperature of layer i−1 in degrees Celsius $T_{i+1}$=temperature of layer i+1 in degrees Celsius $T_i$=temperature of layer i in degrees Celsius The total power dissipated in a particular layer of material i every second due to the application of the dielectric field and the heat exchange between adjacent layers of material may also be expressed as follows:

$$P_i + Q_i = 16.387 \times h_i \times \rho_i \times d_i \times \Delta T_i \qquad (20)$$

One skilled in the art will understand that equations (19) or (20) may then be used in connection with the analysis set forth above to calculate the molding time of a reference layer of material, the required power factors for the remaining layers of material, and the amount of additive to be mixed with each the remaining layers of material in order to obtain the required power factors. Preferably, the analysis takes into account the fact that the power factor, relative dielectric constant, specific heat and thermal conductivity of each of the layers of material vary with temperature by performing the calculations at regular time intervals via the use of a computer (as discussed above).

It should further be understood that, with respect to foam materials, the analysis set forth above does not consider the exothermic or endothermic reaction that occurs when a blowing agent reaches its decomposition temperature (which, for many blowing agents, is 150° C). The change in heat caused by this exothermic or endothermic reaction varies in time and may be added to the above equations if desired. Of course, one skilled in the art will appreciate that the impact of the exothermic or endothermic reaction is not highly significant because it occurs near the end of the heating cycle and does not involve a large amount of energy.

Figure 2:
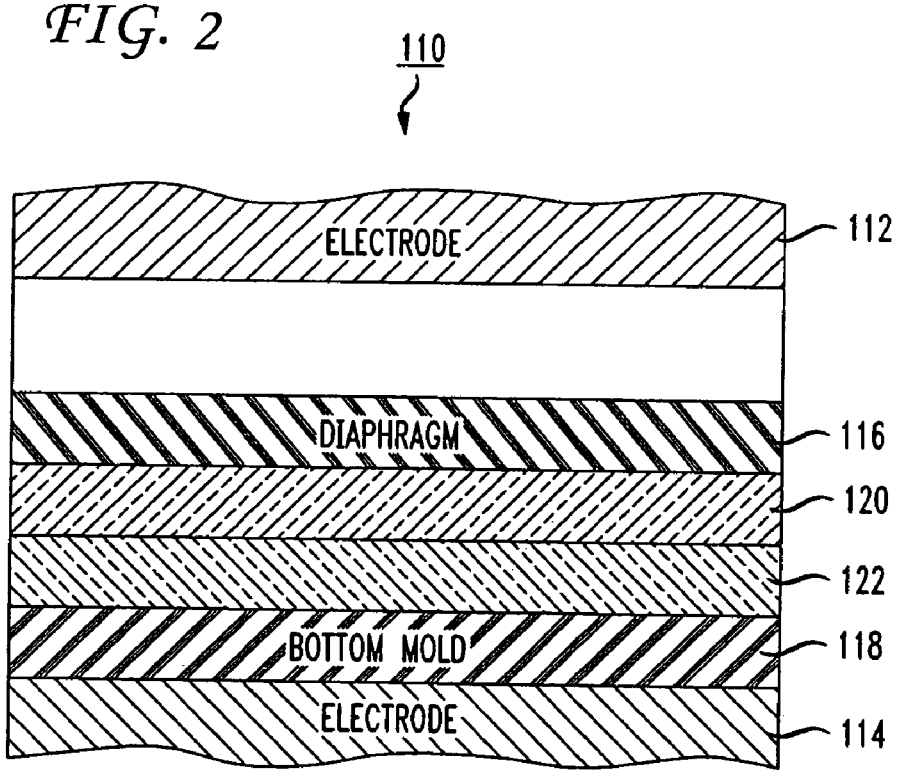
FIG. 2 is a diagram of a flow molding apparatus wherein two different formable materials (one foam material and one non-foam material) have been placed between a diaphragm and a bottom mold of the apparatus for making a molded article in accordance with the method of the present invention.

Referring now to FIG. 2, the diagram of a flow molding apparatus that may be used to make molded articles from a foam material and a non-foam material is designated generally as numeral 110. Flow molding apparatus 110 includes a top electrode 112 and a bottom electrode 114, both of which are connected to an electromagnetic energy source (not shown) operable to generate an alternating electric field between the electrodes. Again, the alternating electric field may be generated at frequencies ranging from 1 MHz to 500 MHz, is preferably generated at frequencies ranging from 10 MHz to 100 MHz, and is most preferably generated at either 26 MHz or 40 MHz. Also included within apparatus 110 are a top mold or diaphragm 116 and a bottom mold 118 that together define a molding cavity therebetween.

In the illustrated example, a first formable material 120 (comprising a foam material) and a second formable material 122 (comprising a non-foam material) are placed within the molding cavity such that first formable material 120 is located adjacent diaphragm 116 and second formable material 122 is in contact with the top surface of bottom mold 118. Of course, it should be understood that more than two formable materials could also be placed within the molding cavity. In operation, an alternating dielectric field is applied across first and second formable materials 120 and 122 and a conductive fluid is injected into apparatus 110 above diaphragm 116 so as to compress diaphragm 116 and thereby provide uniform pressure on first formable material 122 as it expands within the molding cavity. At the end of the heating cycle, first and second formable materials 120 and 122 are bonded to one another to thereby form the molded article.

It should be understood that the analysis described above with reference to flow molding apparatus 10 and formable materials 20 and 22 of FIG. 1 could also be applied to flow molding apparatus 110 and formable materials 120 and 122 of FIG. 2 (as set forth in detail with respect to Examples 1 and 2 below). It should also be understood that flow molding apparatuses 10 and 110 are merely examples of apparatuses that may be used to make molded articles in accordance with the method of the present invention. Other flow molding apparatuses (and related methods) may also be used, such as those disclosed in U.S. Pat. No. 4,268,238, U.S. Pat. No. 4,441,876, U.S. Pat. No. 4,524,037 and U.S. Pat. No. 4,851,167, all of which are incorporated herein by reference.

Two examples will now be provided with reference to the flow molding apparatus of FIG. 2 to further describe the method of the present invention. It should be understood that these examples are provided merely to illustrate the manner in which the method may be used to manufacture a molded article from specific formable materials and do not in any way limit the scope of the present invention.

EXAMPLE 1

As shown in FIG. 2, there are four layers of material between top electrode 112 and bottom electrode 114, namely, diaphragm 116 (layer 1), first formable material 120 (layer 2), second formable material 122 (layer 3), and bottom mold 118 (layer 4). Assume for purposes of this example that diaphragm 116 and bottom mold 118 are each formed from silicone rubber V-1010 (manufactured by Rhodia Inc.), first formable material 120 comprises a layer of plastic foam material and second formable material 122 comprises a layer of rubber material.

Table 1 is provided below to show various factors for each of these layers of material, namely, the desired temperature (T) at the end of the heating cycle, thickness (d), power factor (pf), relative dielectric constant ($\in$), specific heat (h), and specific gravity ($\rho$). These factors will be used hereinbelow to perform various calculations in accordance with the method of the present invention.

TABLE 1

| | Diaphragm (layer 1) | Plastic Foam Material (layer 2) | Rubber Material (layer 3) | Bottom Mold (layer 4) |
|---|---|---|---|---|
| Desired Temperature (T) (degrees Celsius) | 200 | 200 | 167 | 167 |
| Thickness (d) (inches) | .0625 | .31 | .09 | .14 |
| Power Factor (pf) | | .0137 | | |
| Relative Dielectric Constant ($\epsilon$) | 3.07 | 2.67 | 3.13 | 2.67 |
| Specific Heat (h) | 1.233 | 1.566 | 1.509 | 1.233 |
| Specific Gravity ($\rho$) | 1.16 | 1.0408 | 1.105 | 1.16 |

As can be seen from Table 1, the desired temperature of plastic foam material 120 at the end of the heating cycle is 200° C. (which is the temperature at which plastic foam material 122 is blown and cross-linked). Also, the desired temperature of rubber material 122 at the end of the heating cycle is 167° C. (which is the curing temperature of rubber material 122). In this example, the temperatures of diaphragm 116 and bottom mold 118 are chosen so that plastic foam material 120 and rubber material 122 will cure all the way through. As such, the desired temperature of the bottom surface of diaphragm 116 at the end of the heating cycle is 200° C. (the molding temperature of plastic foam material 120) and the desired temperature of the top surface of bottom mold 118 at the end of the heating cycle is 167° C. (the molding temperature of rubber material 122). Alternatively, the temperature of diaphragm 16 could be chosen so that a hardened skin is formed on the top surface of plastic foam material 120 as described in Applicant's co-pending patent application entitled "Method of Forming a Hardened Skin on a Surface of a Molded Article," which is incorporated herein by reference.

Table 1 also shows the various values for the thickness (d) of each of the layers of material which, as illustrated in FIG. 2, are shown as being constant along the length of the molded article. It should be understood, however, that many molded articles will have one or more layers of material in which the thickness varies at different points along the length of the molded article. For example, the thickness of plastic foam material 120 may continuously vary, while the thickness of rubber material 122 remains constant. In that case, bottom mold 118 would preferably be configured so that its thickness varies in such a manner that the sum of the thickness values for plastic foam material 120 and bottom mold 118 remain constant. As such, the total distance between top electrode 112 and bottom electrode 114 would remain constant to thereby provide uniform heating of plastic foam material 120 (as described in U.S. Pat. No. 4,268,238). It should also be noted that the relative dielectric constants ($\in$) of plastic foam material 120 and bottom mold 118 would preferably be equalized (as shown in Table 1) so that plastic foam material 120 would be uniformly heated (as discussed in U.S. Pat. No. 4,441,876).

Figure 3:
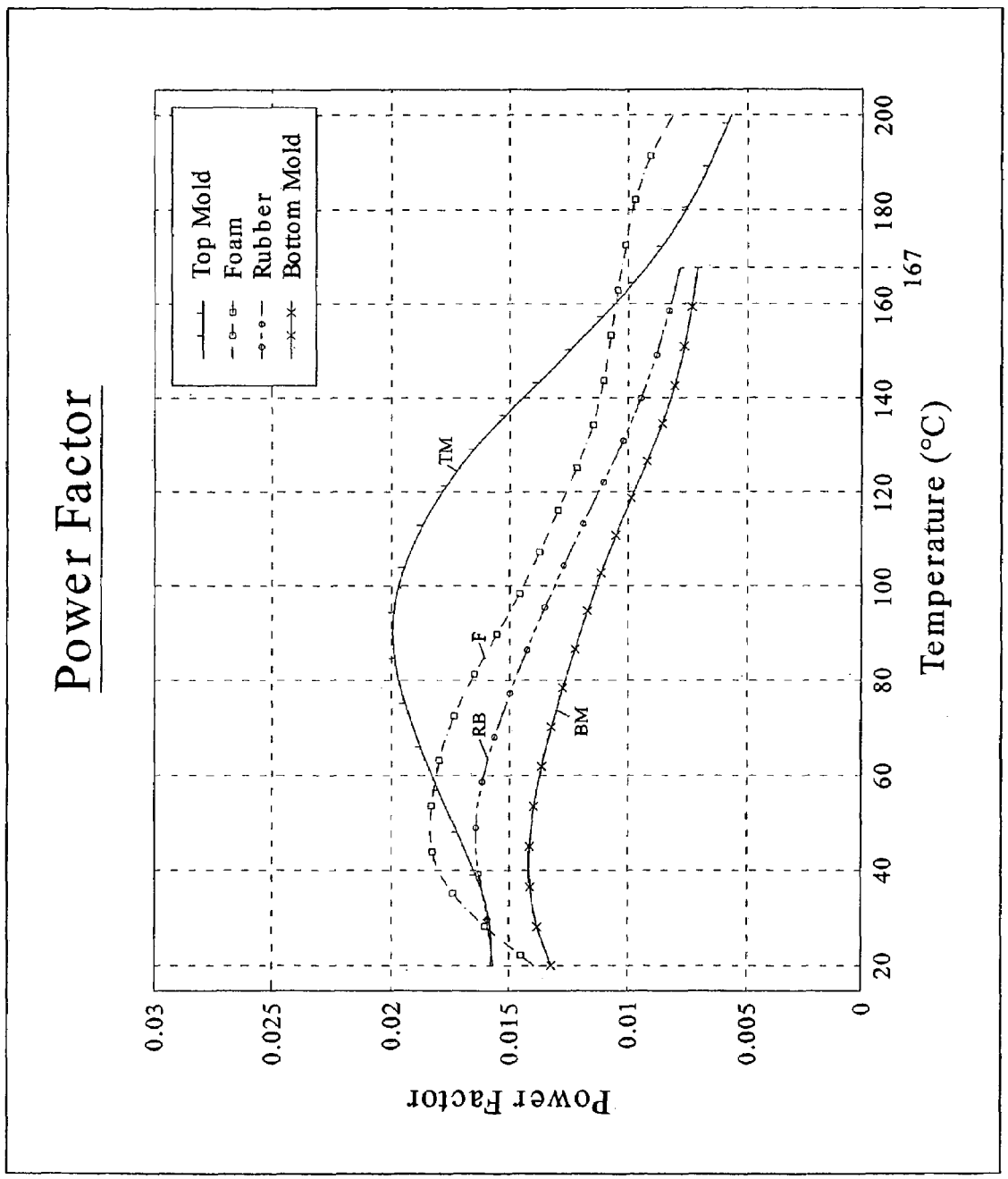
FIG. 3 is a graphical representation showing the relationship between the temperature (T) versus the power factor (pf) for each of the diaphragm, the plastic foam material, the rubber material, and the bottom mold in accordance with a first example of the present invention.
Figure 4:
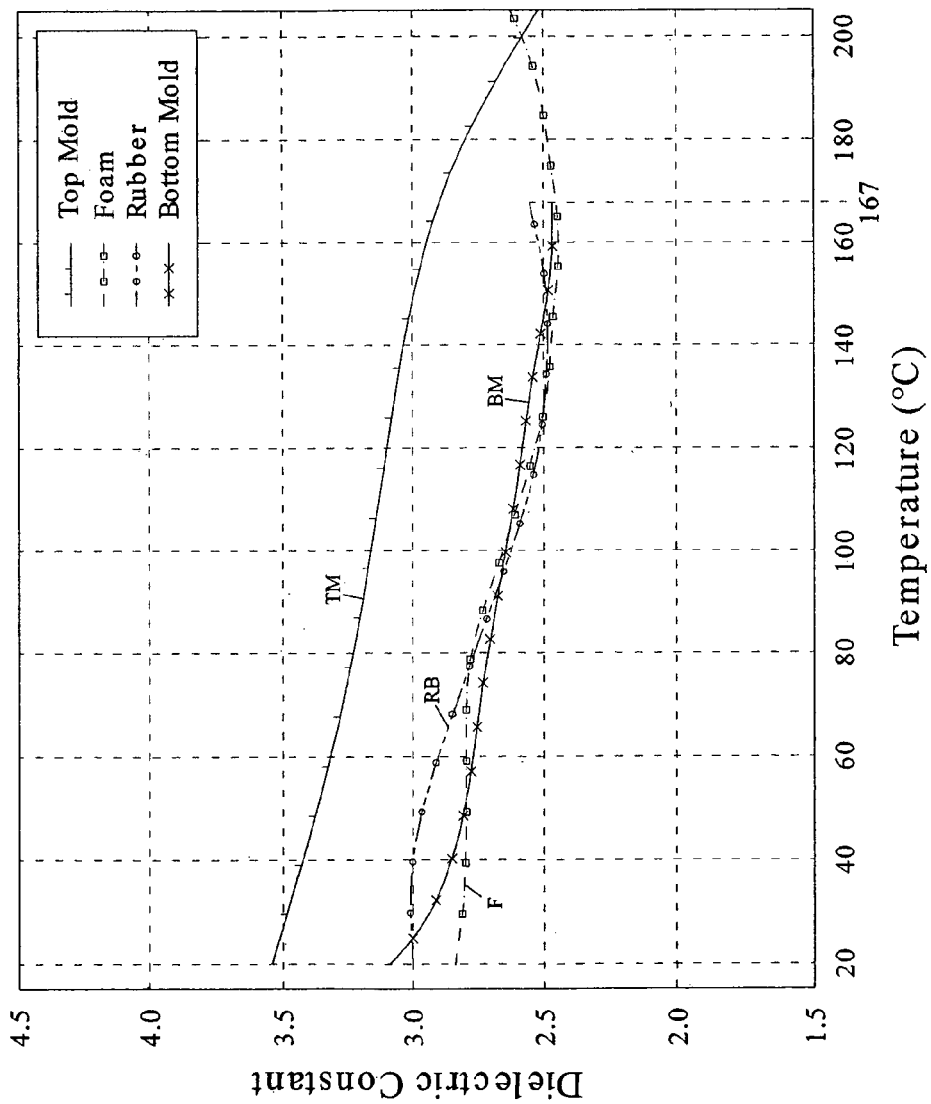
FIG. 4 is a graphical representation showing the relationship between the temperature (T) versus the relative dielectric constant ($\in$) for each of the diaphragm, the plastic foam material, the rubber material, and the bottom mold in accordance with the first example of the present invention.
Figure 5:
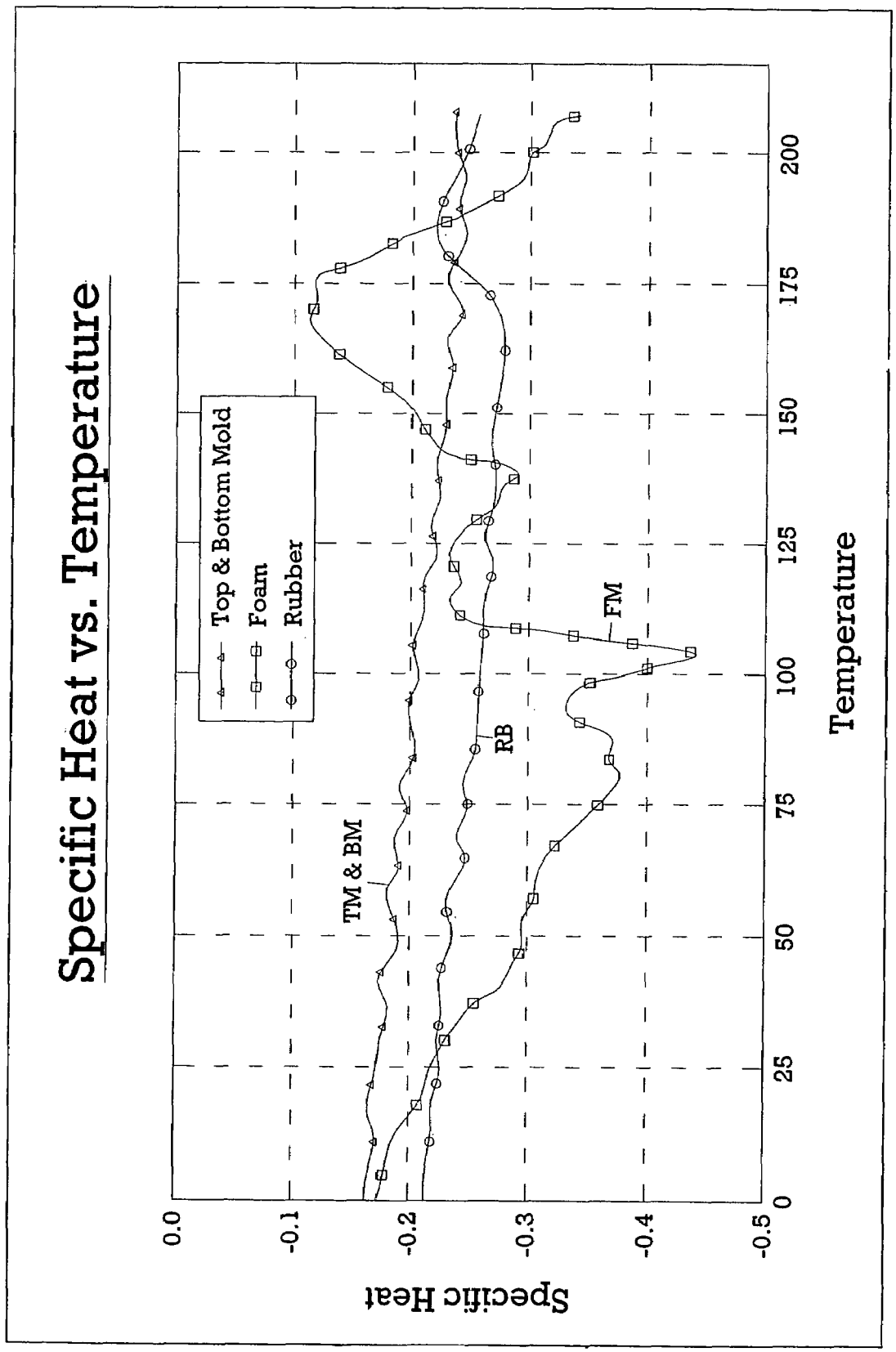
FIG. 5 is a graphical representation showing the relationship between the temperature (T) versus the specific heat (h) for each of the diaphragm, the plastic foam material, the rubber material, and the bottom mold in accordance with the first example of the present invention.

In addition, Table 1 shows the various values for the power factor (pf), relative dielectric constant (∈), specific heat (h) and specific gravity (ρ) for each of the layers of material. As discussed above, the values for the power factor (pf), relative dielectric constant (∈) and specific heat (h) vary with temperature. For example, FIG. 3 illustrates the temperature dependence of the power factor (pf) for each of the layers of material, FIG. 4 illustrates the temperature dependence of the relative dielectric constant (∈) for each of the layers of material, and FIG. 5 illustrates the temperature dependence of the specific heat (h) for each of the layers of material. It should be understood that the curves of FIGS. 3-5 were each integrated over the entire temperature range and the resultant averages are shown in Table 1 (which will be used to provide a close approximation of the molding time and required power factors in accordance with the analysis set forth above).

In accordance with the method of the present invention, plastic foam material 120 is selected as the reference material. Equations (1)-(11) may then be used to calculate the molding time of plastic foam material 120, as well as the required power factors for rubber material 122, diaphragm 116 and bottom mold 118. It should be understood that the subscripts used in the following equations denote the layer number of the particular material (i.e., subscript 1 denotes diaphragm 116 (layer 1), subscript 2 denotes plastic foam material 120 (layer 2), subscript 3 denotes rubber material 122 (layer 3), and subscript 4 denotes bottom mold 118 (layer 4)).

First, the capacitance of each of the layers of material may be calculated from equation (1) using the values for the relative dielectric constant ($\in_i$) and thickness ($d_i$) shown in Table 1 (assuming that the area of each of the layers of material is 1 inch$^2$):

$$C_1 = \frac{25.4 \times 3.07 \times 1}{36 \times \pi \times .0625} = 11.032 \text{ pF}$$

$$C_2 = \frac{25.4 \times 2.67 \times 1}{36 \times \pi \times .31} = 1.934 \text{ pF}$$

$$C_3 = \frac{25.4 \times 3.13 \times 1}{36 \times \pi \times .09} = 7.811 \text{ pF}$$

$$C_4 = \frac{25.4 \times 2.67 \times 1}{36 \times \pi \times .14} = 4.283 \text{ pF}$$

Next, the equivalent capacitance may be calculated from equation (2) using the capacitance values for each of the layers of material derived above:

$$C_{eq} = \frac{11.032 \times 1.934 \times 7.811 \times 4.283}{(11.032 \times 1.934 \times 7.811) + (11.032 \times 1.934 \times 4.283) + (11.032 \times 7.811 \times 4.283) + (1.934 \times 7.811 \times 4.283)}$$

$$= 1.032 \text{ pF}$$

The equivalent reactance may then be calculated from equation (3) using the equivalent capacitance ($C_{eq}$) derived above (assuming that the frequency of the electric field is 40 MHz):

$$X_{eq} = \frac{1}{2 \times \pi \times 40 \times 10^6 \times 1.032 \times 10^{-12}} = 3,855.5 \text{ ohms}$$

The current passing between top electrode 112 and bottom electrode 114 through all of the layers of material may then be calculated from equation (6) using the equivalent reactance ($X_{eq}$) derived above (assuming that the voltage is 4,000 volts):

$$I = \frac{4,000}{3,855.5} = 1.032 \text{ amperes}$$

Finally, the molding time for plastic foam material 120 may be calculated from equation (10) using the current (I) and capacitance ($C_2$) derived above and the values for the temperature ($T_2$), thickness ($d_2$), power factor ($pf_2$), specific heat ($h_2$), and specific gravity ($\rho_2$) shown in Table 1 (assuming that the starting temperature is 0° C.):

$$t_2 = \frac{\frac{16.387 \times 200 \times 1.566 \times 1.0408 \times .31}{.0137 \times 1.032^2}}{2 \times \pi \times 40 \times 10^6 \times 1.934 \times 10^{-12}} = 55 \text{ sec}$$

Thus, it can be seen that the molding time for plastic foam material 120 is 55 seconds (i.e., the time that it takes plastic foam material 120 to reach its molding temperature of 200° C.).

Next, a required power factor for rubber material 122 may be calculated from equation (11) using the calculated molding time ($t_2$) for plastic foam material 120, the current (I) and capacitance ($C_3$) derived above, and the values for the temperature ($T_3$), thickness ($d_3$), specific heat ($h_3$), and specific gravity ($\rho_3$) shown in Table 1 (again, assuming that the starting temperature is 0° C.):

$$pf_3 = \frac{16.387 \times 167 \times 1.509 \times 1.105 \times .09 \times \frac{2 \times \pi \times 40 \times 10^6 \times 7.811 \times 10^{-12}}{55 \times 1.032^2}}$$

$$= 0.0134$$

Thus, the required power factor for rubber material 122 is 0.0134 (i.e., the power factor that would allow rubber material 122 to reach its molding temperature of 167° C. at substantially the same time that plastic foam material 120 reaches its molding temperature of 200° C.).

Equation (11) may also be used to calculate a required power factor for diaphragm 116 using the calculated molding time ($t_2$) for plastic foam material 120, the current (I) and capacitance ($C_1$) derived above, and the values for the temperature ($T_1$), thickness ($d_1$), specific heat ($h_1$), and specific gravity ($\rho_1$) shown in Table 1 (again, assuming that the starting temperature is 0° C.):

$$pf_1 = \frac{16.387 \times 200 \times 1.233 \times 1.16 \times .0625 \times \frac{2 \times \pi \times 40 \times 10^6 \times 11.032 \times 10^{-12}}{55 \times 1.032^2}}$$

$$= 0.0158$$

Thus, the required power factor for diaphragm 116 is 0.0158 (i.e., the power factor that would allow the bottom surface of diaphragm 116 to reach a temperature of 200° C. at substantially the same time that plastic foam material 120 reaches its molding temperature of 200° C.).

Similarly, equation (11) may be used to calculate a required power factor for bottom mold 118 using the calculated molding time ($t_2$) for plastic foam material 120, the current (I) and capacitance ($C_4$) derived above, and the values for the temperature ($T_4$), thickness ($d_4$), specific heat ($h_4$), and specific gravity ($\rho_4$) shown in Table 1 (again, assuming that the starting temperature is 0° C.):

$$pf_4 = \frac{16.387 \times 167 \times 1.233 \times 1.16 \times .14 \times}{2 \times \pi \times 40 \times 10^6 \times 4.283 \times 10^{-12}}{55 \times 1.032^2}$$

$$= 0.0115$$

Thus, the required power factor for bottom mold 118 is 0.0115 (i.e., the power factor that would allow the top surface of bottom mold 118 to reach a temperature of 167° C. at substantially the same time that rubber material 122 reaches its molding temperature of 167° C.).

Finally, the power factors of rubber material 122, diaphragm 116 and bottom mold 118 are each adjusted by selecting an additive, calculating the amount of additive to be mixed with the material so that the power factor matches the required power factor derived above, and then mixing the calculated amount of additive with the material. It should be noted that this part of the analysis will be described in greater detail hereinbelow with respect to Example 2.

EXAMPLE 2

Referring again to FIG. 2, assume for purposes of this example that diaphragm 116 of flow molding apparatus 110 is formed of silicone rubber 3112 (manufactured by Dow Chemical Corp.) and that the required power factor for diaphragm 116 is $pf_i$. In accordance with the method of the present invention, equations (13) and (14) may be used to determine the amount of an additive to be mixed with diaphragm 116 so that the power factor equivalent $pf_{eq}$ matches the required power factor $pf_i$.

In this example, the anti-static additive Cyastat SN is selected to be mixed with the silicone rubber 3112 of diaphragm 116. Equation (13) may then be used to calculate the power factor equivalent $pf_{eq}$ as a function of the percentage of Cyastat SN mixed with silicone rubber 3112 (wherein the power factor of silicone rubber 3112 is 0.0043, the relative dielectric constant of silicone rubber 3112 is 3.62, the power factor of Cyastat SN is 0.60825, and the relative dielectric constant of Cyastat SN is 4.7663):

$$pf_{eq} = \frac{(.0043 \times (100-x) \times 4.7663) + (.60825 \times x \times 3.62)}{(3.62 \times x) + (4.7663 \times (100-x))}$$

$$= \frac{2.04951 + 2.18137x}{476.63 - 1.1463x}$$

Figure 6:
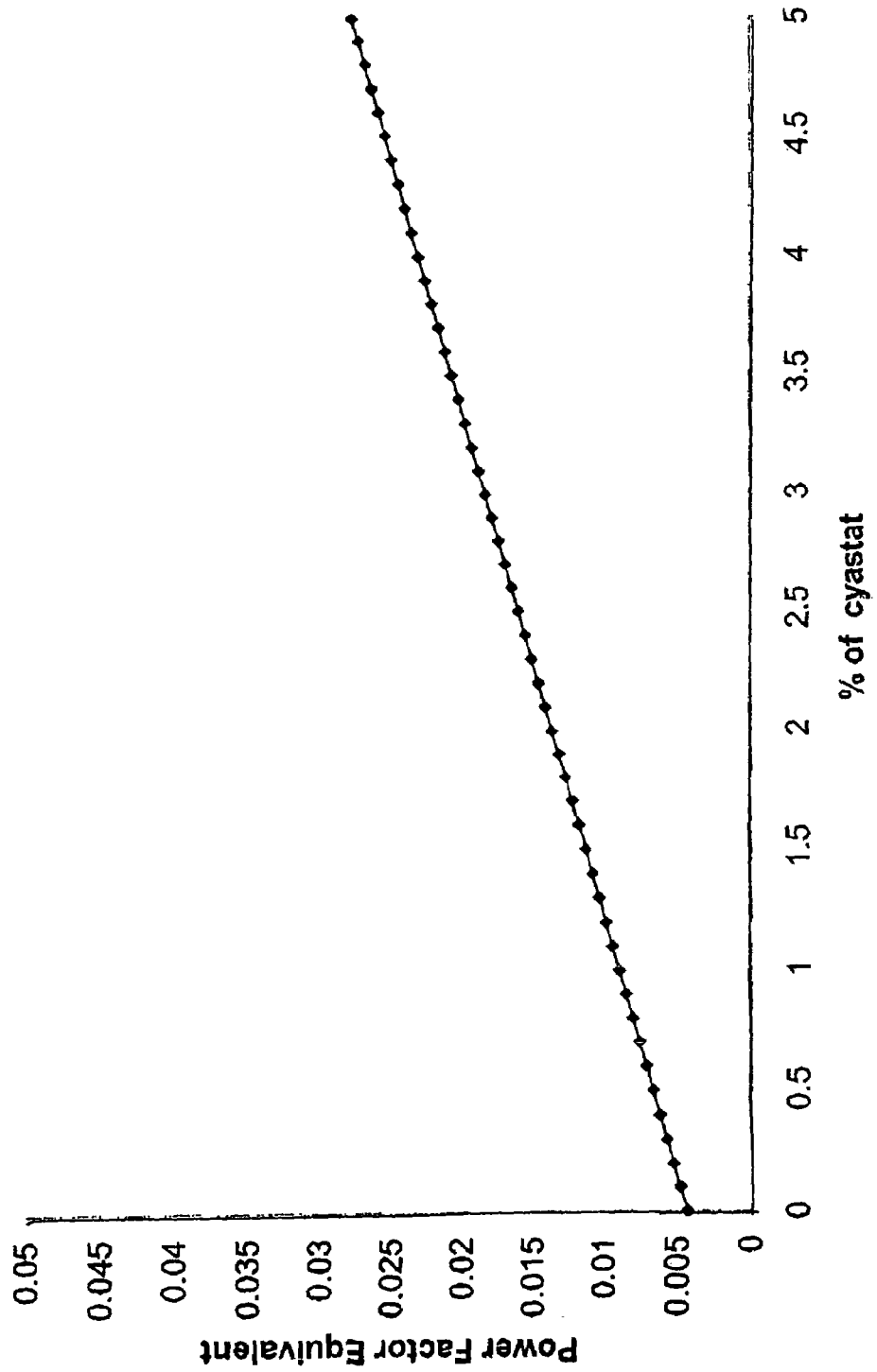
FIG. 6 is a graphical representation showing the relationship between the percentage of additive Cyastat SN mixed with silicone rubber 3112 versus the power factor equivalent ($pf_{eq}$) in accordance with a second example of the present invention.

The relationship between the percentage of Cyastat SN mixed with silicone rubber 3112 versus the power factor equivalent $pf_{eq}$ (as calculated above) is illustrated graphically in FIG. 6. As such, the graph of FIG. 6 could be used to determine the percentage of Cyastat SN by volume that must be mixed with the silicone rubber 3112 of diaphragm 116 in order to obtain a power factor equivalent $pf_{eq}$ that matches the required power factor $pf_i$.

Equation (14) may also be used to calculate the amount of Cyastat SN mixed with silicone rubber 3112 as a function of the power factor equivalent $pf_{eq}$ (using the same values for the power factors and relative dielectric constants of the silicone rubber 3112 and Cyastat SN):

$$x = \frac{(100 \times .0043 \times 4.7663) - (100 \times pf_{eq} \times 4.7663)}{(pf_{eq} \times 3.62) - (pf_{eq} \times 4.7663) +}$$
$$(.0043 \times 4.7663) - (.60825 \times 3.62)$$

$$= \frac{(476.63 \times pf_{eq}) - (2.04951)}{(1.1463 \times pf_{eq}) + (2.18137)}$$

Figure 7:
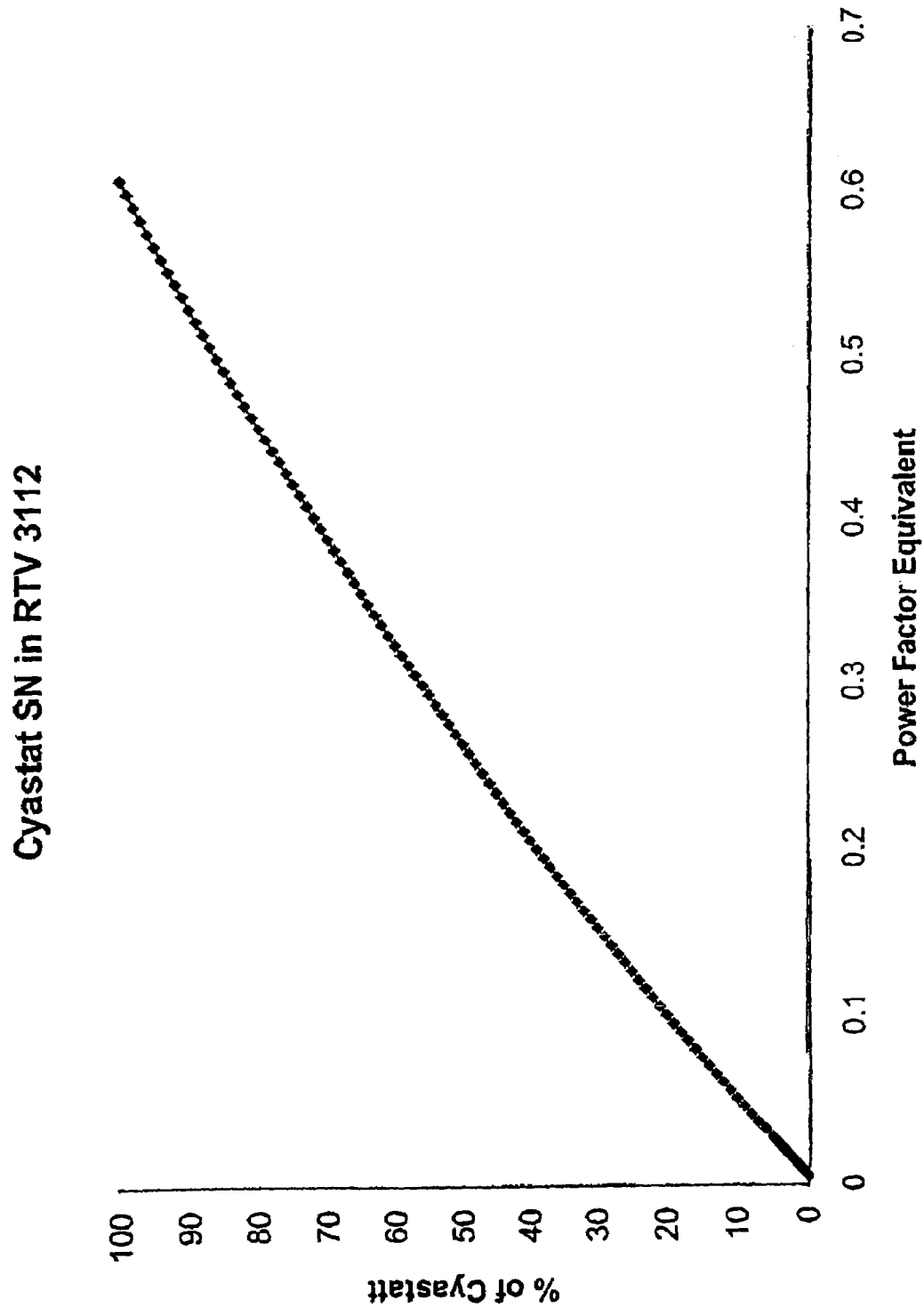
FIG. 7 is a graphical representation showing the relationship between the power factor equivalent ($pf_{eq}$) versus the percentage of Cyastat SN mixed with silicone rubber 3112 in accordance with the second example of the present invention.

The relationship between the power factor equivalent $pf_{eq}$ versus the percentage of Cyastat SN mixed with silicone rubber 3112 (as calculated above) is illustrated graphically in FIG. 7. As such, the graph of FIG. 7 could also be used to determine the percentage of Cyastat SN by volume that must be mixed with the silicone rubber 3112 of diaphragm 116 in order to obtain a power factor equivalent $pf_{eq}$ that matches the required power factor $pf_i$.

It should be understood that the above analysis could also be used to determine the amount of a selected additive to be mixed with bottom mold 118 so that the power factor equivalent $pf_{eq}$ matches its required power factor and the amount of a selected additive to be mixed with rubber material 122 so that the power factor equivalent $pf_{eq}$ matches its required power factor (assuming, of course, that plastic foam material 120 is selected as the reference material).

Finally, it should be understood that the method of the present invention may be used to make a molded article in which the different formable materials are arranged in distinct layers, as shown in the examples above (e.g., an article comprising a first layer of rubber and a second layer of EVA). Alternatively, the method may be used to make a molded article in which the different formable materials are blended together (e.g., an article comprising a blend of EVA and PVC). Furthermore, the method may be used to make a molded article with distinct layers wherein one or more of the layers comprises a blend of different formable materials (e.g., an article comprising a first layer of rubber and a second layer of EVA blended with PVC). In all of these cases, the analysis set forth above may be used to assure that all of the formable materials (whether a distinct layer or part of a blend) reach their respective molding temperatures at substantially the same time.

While the present invention has been described and illustrated hereinabove with reference to an exemplary method, it should be understood that various modifications could be made to this method without departing from the scope of the invention. Therefore, the invention is not to be limited to the exemplary method described and illustrated hereinabove, except insofar as such limitations are included in the following claims.

What is claimed and desired to be secured by Letters Patent is as follows:

1. A method of making a molded article from at least first and second formable materials in a single heating cycle, comprising the steps of:
providing a flow molding apparatus comprising a mold positioned between a first electrode and a second electrode, wherein the mold defines a molding cavity;

providing first and second formable materials capable of flowing within the molding cavity when heated to first and second molding temperatures, respectively;

calculating a molding time for the first formable material to reach the first molding temperature;

calculating a required power factor for the second formable material that will allow the second formable material to reach the second molding temperature in the molding time of the first formable material;

calculating an amount of an additive to be mixed with the second formable material to obtain the required power factor;

mixing the calculated amount of the additive with the second formable material;

placing the first and second formable materials in the molding cavity of the flow molding apparatus; and heating the first and second formable materials in the molding cavity of the flow molding apparatus whereby the entire mass of the first formable material reaches the first molding temperatures at substantially the same time that the entire mass of the second formable material reaches the second molding temperature such that the first and second formable materials flow to thereby form a defined shape within the molding cavity of the flow molding apparatus.

2. The method of claim 1, wherein the mold of the flow molding apparatus comprises a first mold having a first surface in contact with the first formable material and a second mold having a second surface in contact with the second formable material, and wherein the first and second molds are modified so that the first and second surfaces reach temperatures that are substantially the same as the first and second molding temperatures of the first and second formable materials, respectively, upon completion of the single heating cycle.

3. The method of claim 1, wherein the first and second formable materials are heated by applying an alternating electric field across the formable materials.

4. The method of claim 1, wherein the first and second formable materials are arranged in two distinct layers to form the molded article.

5. The method of claim 1, wherein the first and second formable materials are blended together to form the molded article.

6. The method of claim 1, wherein each of the first and second formable materials is selected from the group consisting of: thermoplastics and thermosets.

7. The method of claim 6, wherein at least one of the first and second formable materials is a foam material.

8. The method of claim 1, wherein the molded article is formed from at least a third formable material.

9. A method of making a molded article from a plurality of different formable materials in a single heating cycle, comprising the steps of:

providing a flow molding apparatus comprising a mold positioned between a first electrode and a second electrode, wherein the mold defines a molding cavity;

providing a plurality of formable materials capable of flowing within the molding cavity when heated to their respective molding temperatures;

selecting one of the formable materials as a reference material whereby the remaining formable materials each comprise a non-reference material;

calculating a molding time for the reference material to reach its molding temperature;

for each non-reference material: (i) calculating a required power factor that will allow the non-reference material to reach its molding temperature in the molding time of the reference material, (ii) calculating an amount of an additive to be mixed with the non-reference material to obtain the required power factor, and (ii) mixing the calculated amount of the additive with the non-reference material;

placing the formable materials in the molding cavity of the flow molding apparatus; and heating the formable materials in the molding cavity of the flow molding apparatus by applying an alternating electric field between the first and second electrodes whereby the entire mass of the formable materials reach their respective molding temperatures at substantially the same time such that the formable materials flow to thereby form a defined shape within the molding cavity of the flow molding apparatus.

10. The method of claim 9, wherein the formable materials are arranged in distinct layers to form the molded article.

11. The method of claim 9, wherein the formable materials are blended together to form the molded article.

12. The method of claim 10, wherein at least one of the distinct layers comprises a plurality of formable materials blended together.

13. A method of making a molded article from at least first and second formable materials in a single heating cycle, wherein each of the formable materials has a power factor associated therewith, comprising the steps of:

providing first and second formable materials having first and second molding temperatures, respectively;

calculating a molding time for the first formable material to reach the first molding temperature, wherein the molding time is based in part on the power factor of the first formable material;

calculating a required power factor for the second formable material that will allow the second formable material to reach the second molding temperature in the molding time of the first formable material;

calculating an amount of an additive to be mixed with the second formable material to obtain the required power factor;

mixing the calculated amount of the additive with the second formable material;

providing a flow molding apparatus comprising a mold positioned between a first electrode and a second electrode, wherein the mold defines a molding cavity;

placing the first and second formable materials in the molding cavity of the flow molding apparatus; and heating the first and second formable materials in the molding cavity of the flow molding apparatus by applying an alternating electric field between the first and second electrodes whereby the entire mass of the first formable material reaches the first molding temperature at substantially the same time that the entire mass of the second formable material reaches the second molding temperature such that the first and second formable materials form a defined shape within the molding cavity of the flow molding apparatus.

14. The method of claim 13, wherein each of the first and second formable materials is selected from the group consisting of: thermoplastics and thermosets.

15. The method of claim 14, wherein at least one of the first and second formable materials is a foam material.

16. The method of claim 13, wherein the mold of the flow molding apparatus comprises a first mold having a first surface in contact with the first formable material and a second mold having a second surface in contact with the second formable material, and wherein the first and second molds are modified so that the first and second surfaces reach temperatures that are substantially the same as the first and second molding temperatures of the first and second formable materials, respectively, upon completion of the single heating cycle.

17. The method of claim 13, wherein the first and second formable materials are arranged in two distinct layers to form the molded article.

18. The method of claim 13, wherein the first and second formable materials are blended together to form the molded article.

19. The method of claim 13, wherein the molded article is formed from at least a third formable material.

20. The method of claim 1, wherein the calculating steps are performed by programming a computer to calculate the molding time for the first formable material, the required power factor for the second formable material, and the amount of the additive to be mixed with the second formable material.

21. The method of claim 9, wherein the calculating steps are performed by programming a computer to calculate the molding time for the reference material, the required power factor for each of the non-reference materials, and the amount of the additive to be mixed with each of the non-reference materials.

22. The method of claim 13, wherein the calculating steps are performed by programming a computer to calculate the molding time for the first formable material, the required power factor for the second formable material, and the amount of the additive to be mixed with the second formable material.

23. A method of making a molded article from at least first and second formable materials in a single heating cycle, comprising the steps of:
provided first and second formable materials having first and second molding temperatures, respectively;
mixing an amount of an additive with the second formable material so that a molding time of the second formable material mixed with the additive is substantially the same as a molding time of the first formable material;
providing a flow molding apparatus comprising a mold positioned between a first electrode and a second electrode, wherein the mold defines a molding cavity;
placing the first and second formable materials in the molding cavity of the flow molding apparatus; and
heating the first and second formable materials in the molding cavity of the flow molding apparatus whereby the entire mass of the first formable material reaches the first molding temperature at substantially the same time that the entire mass of the second formable material reaches the second molding temperature such that the first and second formable materials form a defined shape within the molding cavity of the flow molding apparatus.

* * * * *